(12) United States Patent
Inha et al.

(10) Patent No.: US 8,154,247 B2
(45) Date of Patent: Apr. 10, 2012

(54) PORTABLE TELECOMMUNICATIONS DEVICE

(75) Inventors: Kai Inha, Järvenpää (FI); Mikael Troberg, Salo (FI); Petri Vuori, Salo (FI)

(73) Assignee: Nokia Corporation (FI)

( * ) Notice: Subject to any disclaimer, the term of this patent is extended or adjusted under 35 U.S.C. 154(b) by 0 days.

(21) Appl. No.: 11/763,303

(22) Filed: Jun. 14, 2007

(65) Prior Publication Data
US 2008/0309294 A1 Dec. 18, 2008

(51) Int. Cl.
*H02J 7/00* (2006.01)
(52) U.S. Cl. .................... 320/112; 320/114
(58) Field of Classification Search ........... 320/112–116
See application file for complete search history.

(56) References Cited

U.S. PATENT DOCUMENTS

| | | | |
|---|---|---|---|
| 5,175,485 A | 12/1992 | Woo | |
| 5,177,677 A * | 1/1993 | Nakata et al. | 363/89 |
| 5,504,413 A * | 4/1996 | Fernandez et al. | 320/163 |
| 5,625,275 A | 4/1997 | Tanikawa et al. | |
| 5,986,437 A | 11/1999 | Lee | |
| 6,144,187 A * | 11/2000 | Bryson | 320/137 |
| 6,188,199 B1 * | 2/2001 | Beutler et al. | 320/125 |
| 6,414,303 B1 * | 7/2002 | Kersey | 250/227.14 |
| 6,414,403 B2 * | 7/2002 | Kitagawa et al. | 307/66 |
| 6,522,118 B1 | 2/2003 | Barcelo et al. | |
| 6,647,580 B2 * | 11/2003 | Krasuski et al. | 15/104.93 |
| 6,664,758 B2 * | 12/2003 | Yang | 320/107 |
| 2004/0095095 A1 | 5/2004 | Yamamoto et al. | |
| 2005/0007075 A1 | 1/2005 | Woo et al. | |
| 2005/0189916 A1 * | 9/2005 | Bucur | 320/128 |
| 2006/0197382 A1 * | 9/2006 | Chou et al. | 307/48 |

FOREIGN PATENT DOCUMENTS

| | | |
|---|---|---|
| EP | 1 043 824 A | 10/2000 |
| EP | 1 691 466 A | 8/2006 |

OTHER PUBLICATIONS

International Search Report for PCT Application No. PCT/EP2008/053728.

* cited by examiner

*Primary Examiner* — Samuel Berhanu
(74) *Attorney, Agent, or Firm* — Banner & Witcoff, Ltd.

(57) ABSTRACT

A portable telecommunications device comprises a charging interface for connection to an external power supply, a voltage and current ratio converter configured to convert an input voltage at the charging interface into an output voltage for charging a battery; and a controller configured to control the converter.

21 Claims, 4 Drawing Sheets

PORTABLE TELECOMMUNICATIONS DEVICE

FIELD OF THE INVENTION

The present invention relates to a portable telecommunications device having a charging interface for connection to an external power supply for charging a battery of the portable telecommunications device.

BACKGROUND TO THE INVENTION

Portable telecommunications devices such as mobile telephones are typically powered by a battery pack and require periodic charging from a power supply such as a mains power supply or a car battery. The devices typically include a charging interface into which a connector of a charger is plugged in order to charge the battery.

Currently, portable telecommunications devices are including applications and functions such as WCDMA video calling, which require increased power consumption. Future applications are likely to require even greater charging powers than existing platforms can supply.

Furthermore, portable telecommunications devices are being made smaller, and accordingly miniaturised connectors are being used on charging devices for connection to the portable telecommunications devices. These miniaturised connectors cannot tolerate high currents, and typically cannot tolerate currents above approximately 1 A. Thus, such miniaturised connectors make it difficult to supply the required power to charge the devices, given that the voltage input is also limited.

SUMMARY OF THE INVENTION

The present invention provides a portable telecommunications device comprising a charging interface for connection to an external power supply, a voltage and current ratio converter configured to convert an input voltage and current at the charging interface into an output voltage and current for charging a battery, and a controller configured to control the voltage and current ratio converter.

The present invention also provides a method of charging a portable telecommunications device comprising providing an input voltage and current to a charging interface of the telecommunications device, converting the input voltage and current at the charging interface into an output voltage and current for charging a battery according to a conversion ratio, and controlling the conversion ratio.

The inclusion of the voltage and current ratio converter and the controller allows greater control over the various charging parameters.

Preferably, the controller is configured to monitor an input current at the charging interface and control the converter so that the input current does not exceed a maximum input current.

Accordingly, the present invention can operate at a maximum voltage of the power supply whilst maintaining a low current which can be tolerated by a charging connector, and the converter reduces the voltage and increases the current inside the device. Thus a higher charging current can be supplied to a battery. This further provides the opportunity to use a device requiring a high current without a battery, using power from a charger.

Preferably, the controller is configured to monitor the input voltage and the input current, and control the converter to maximise the input power. Preferably, the charging current is gradually increased to the point where the external source voltage starts to drop, whereby the current is adjusted to maintain the maximum external source voltage. This means that the maximum charge power can be utilised.

Preferably, the controller is configured to monitor an output current of the converter and control the converter to maximise the output current. The output current is maximised when the input power is maximised.

Preferably, the converter is a buck, or step down, converter.

Preferably, the controller controls the duty cycle of the buck converter.

BRIEF DESCRIPTION OF THE DRAWINGS

Preferred embodiments of the present invention will now be described with reference to the accompanying drawings, in which.

DETAILED DESCRIPTION

Figure 1:
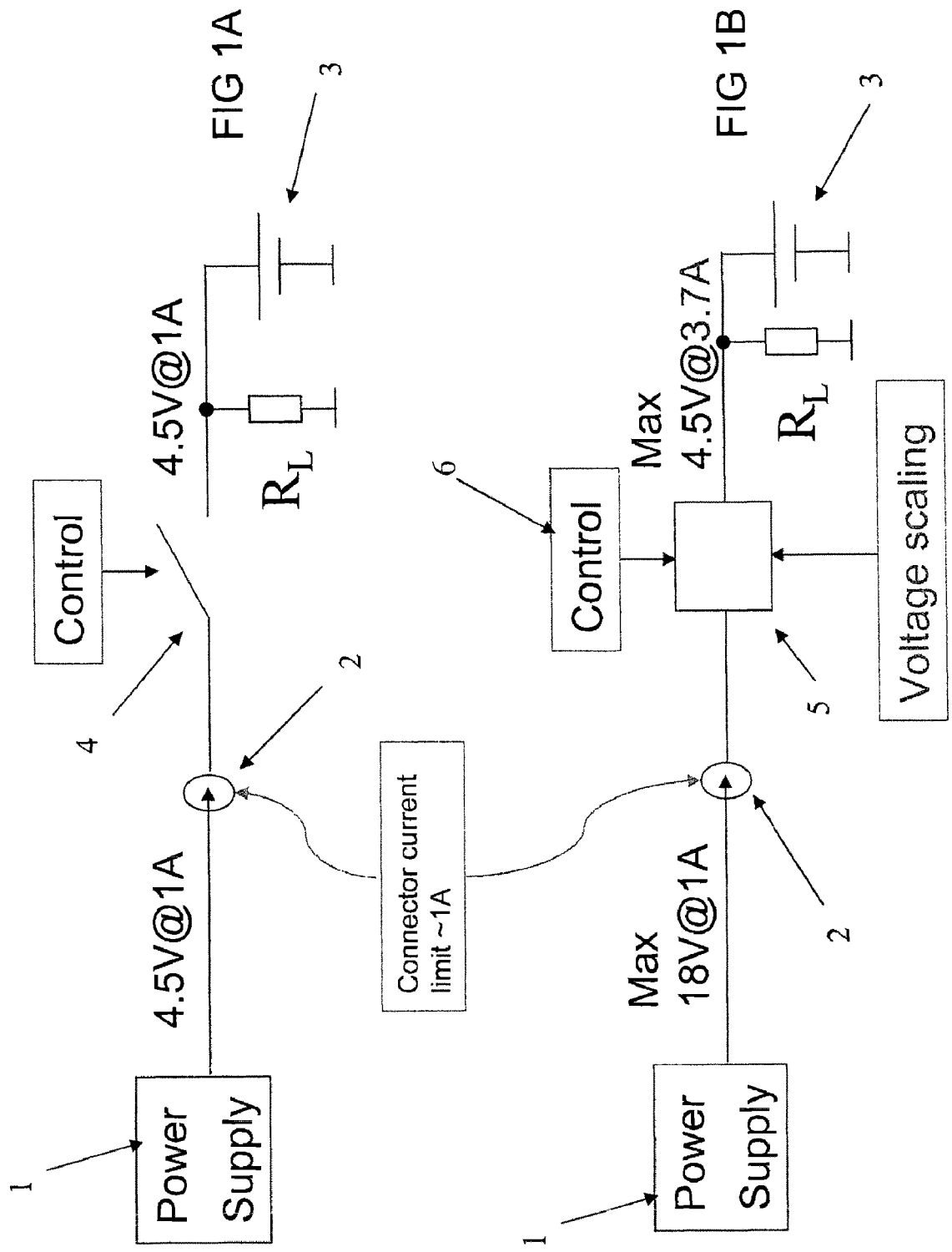
FIG. 1A illustrates a prior art charging system.
FIG. 1B illustrates charging of a device in accordance with the present invention.

FIG. 1A illustrates schematically a prior art charging system for a portable telecommunications device, such as a mobile telephone. A charger provides power from a power supply 1 via a connector 2 in the mobile telephone to charge a battery 3 of the mobile telephone. A switch 4 may be included in the mobile telephone between the connector 2 and the battery 3 to disconnect the charging current when the battery 3 is fully charged. However, in small devices, components such as the connector 2 are miniaturised. Such miniaturised connectors 2 have a maximum current limit, typically of approximately 1 A.

As shown in FIG. 1A, if the output charging voltage to the battery is fixed, for instance at 4.5 V for a standard lithium battery, the maximum input power to the connector 2 is 4.5V at 1 A with the output power to the battery 3 being 4.5V at 1 A.

FIG. 1B illustrates a charging arrangement of the present invention. Instead of the switch 4, the mobile telephone includes a buck or step down converter 5 between the charging connector 2 and the battery 3. As step down mode switching power supplies include a serial switch, no additional switch is needed to isolate the power supply 1 from the battery 3. A controller 6 controls the parameters of the buck converter 5, and in particular monitors parameters such as the input current and voltage and the output current and voltage, and controls parameters of the buck converter 5, such as the duty cycle in order to control the input and output voltages and the input and output currents of the buck converter 5.

As shown in FIG. 1B, the controller 6 can control the buck converter 5 to maintain the input current to be less than or equal to the 1 A limit of the connector 2 whilst maintaining the output voltage at the required charging voltage, in this case 4.5V, whilst drawing 18 volts from the power supply 1 and provided a charging current of 3.7 A. This is calculated as (18V/4.5V)*1 A* 0.9, wherein 0.9 is an efficiency factor which is typically in the range 0.7 to 0.99. To maximise the charging power, the controller 6 can control the buck converter 5 to maximise the input power by maintaining the input current at the maximum 1 A.

Figure 2:
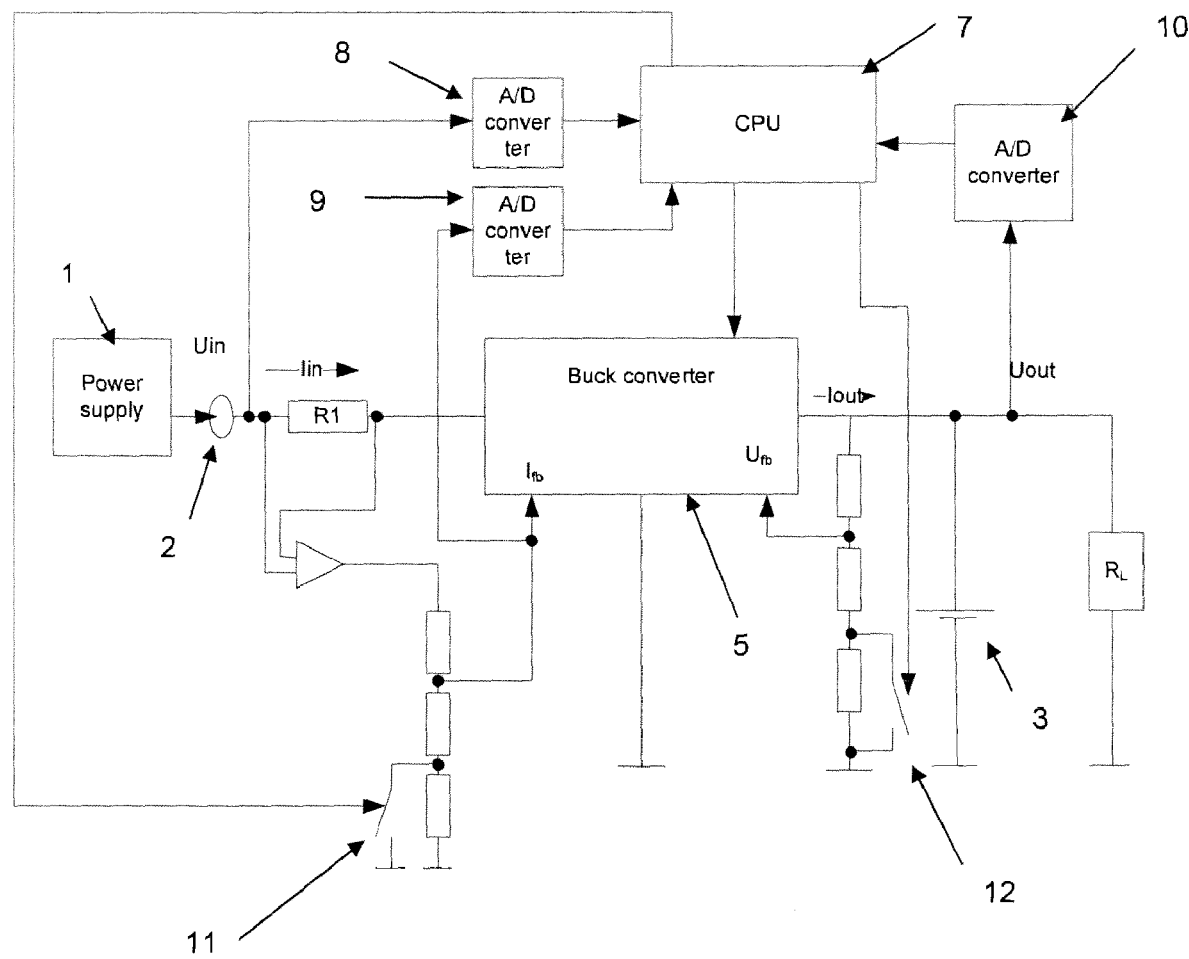
FIG. 2 is a circuit diagram illustrating a device in accordance with the present invention.

FIG. 2 illustrates the system of the present invention in more detail. The power supply 1 provides input power having an input voltage $U_{in}$ and an input current $I_{in}$. $U_{in}$ and $I_{in}$ are monitored by the controller, in the form of CPU 7, using A/D converters 8, 9. The buck converter 5 steps down the voltage to produce output voltage $U_{out}$ and output current $I_{out}$ which are used to charge the battery 3. CPU 7 also monitors output voltage $U_{out}$ using A/D converter 10. CPU 7 monitors the various parameters input from A/D converters 8, 9, 10 and outputs control signals to control switches 11, 12.

Therefore, the CPU 7 can monitor $U_{in}$ and $I_{in}$ and $U_{out}$ and control parameters of the buck converter 5. In particular, where the connector 2 between the power supply 1 and the mobile telephone is a miniaturised connector which can only support currents up to a maximum current limit $I_{in}$ max, the input current $I_{in}$ can be monitored and the parameters of the buck converter 5 controlled such that:

$$I_{in} < I_{in}\ max.$$

Furthermore, the output voltage $U_{out}$ can be monitored and the parameters of the buck controller 5 controlled by the CPU 7 to maintain $U_{out}$ at a voltage appropriate for charging the type of battery. The parameters of the buck converter 5 may be adjusted to maximise the input current $I_{in}$ whilst keeping it below the maximum input current tolerated by the connector 2, so that the output power to the battery 3 is maximised. However, the battery 3 may not be able to use all the input power, for instance if the battery is nearly full, in which case the input current may be reduced. The CPU and the control mechanism make sure that the varying load ($R_L$) is adequately compensated.

Figure 3:
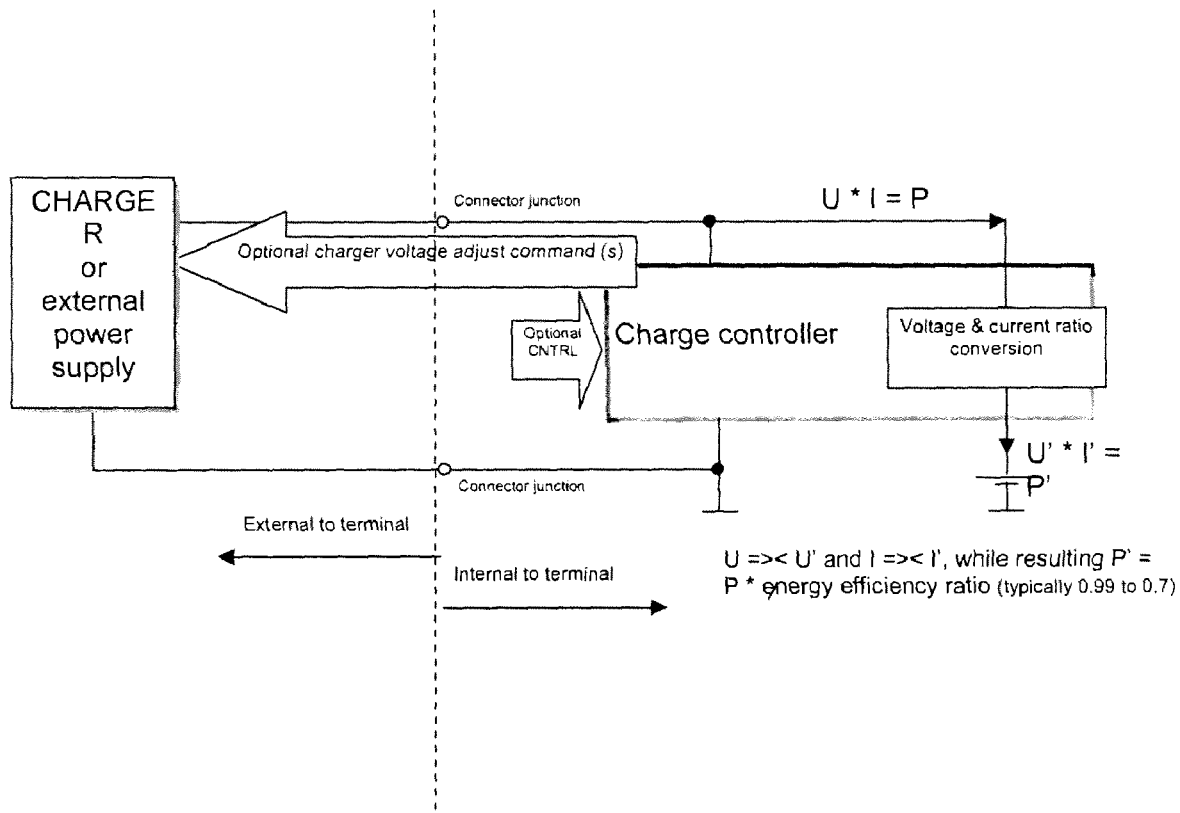
FIG. 3 illustrates control of the external power supply.

FIG. 3 illustrates an embodiment in which the power source (charger) may adjust its output voltage. The charger may be a charging device, another telecommunication device, computing device, or any other equipment capable of providing power. The control of the voltage may be achieved by signalling on the power line by analog modulation, digital data modulation, current modulation, added or subtracted voltage modulation, load interrupt sequencing, RF, magnetic field variations or inductions. If the charger or power source has no means of adjusting its power output, the charge controller can automatically adapt to the output capabilities of the power source.

Figure 4:
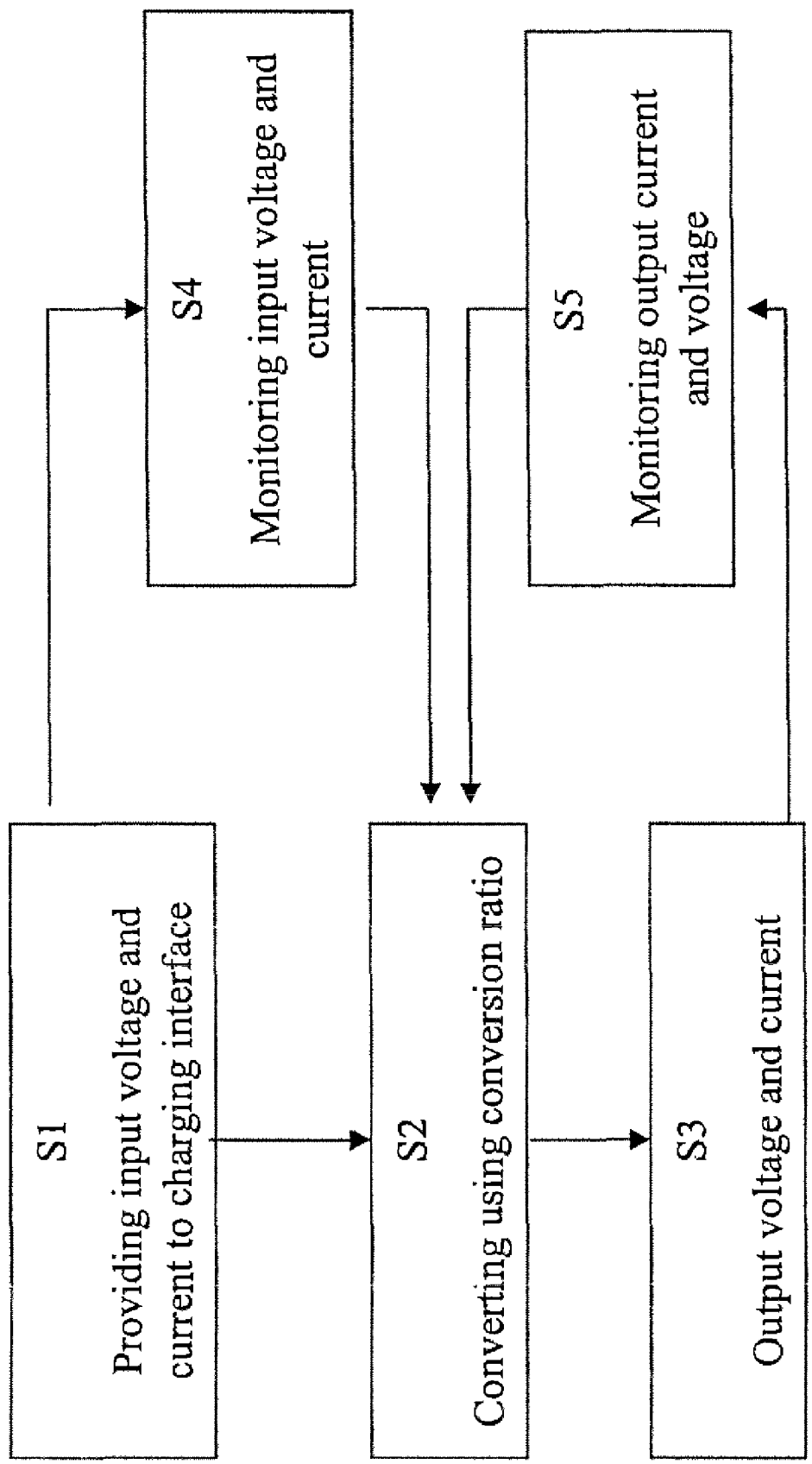
FIG. 4 is a flow chart illustrating a method in accordance with the present invention.

FIG. 4 illustrates a method in accordance with the present invention. In step S1, an input voltage and current are provided to the charging interface. In step S2, these are converted using a conversion ratio and output as an output voltage and current according to the conversion ratio in step S3. In step S4, the input voltage and current are monitored and the result of the monitoring is used to adjust the conversion ratio. In step S5, the output current and voltage are monitored and the conversion ratio is adjusted accordingly.

It should be realised that the foregoing examples should not be construed as limiting. Other variations and modifications will be apparent to persons skilled in the art upon reading the present application. Such variations and modifications extend to features already known in the field, which are suitable for replacing the features described herein, and all functionally equivalent features thereof. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combinations of such features.

The invention claimed is:

1. A portable telecommunications device comprising:
   a charging interface for connection to an external power supply;
   a voltage and current ratio converter configured to convert an input voltage and current at the charging interface into an output voltage and current for charging a battery;
   a controller comprising a processor and one or more analog-to-digital converters configured to monitor the input voltage and current, wherein the controller is configured to control the voltage and current ratio converter so that the output current for charging the battery is higher than the input current at the charging interface;
   the controller further comprising a power supply adjuster for adjusting the intake power from the external power supply by adjusting properties of the external power supply, the power supply adjuster being configured to adjust the properties of the external power supply by signaling on the power line by one or more of the following: analog modulation, digital data modulation, current modulation, added or subtracted voltage modulation, load interrupt sequencing, RF, magnetic field variation or inductions.

2. A telecommunications device according to claim 1, wherein the controller is configured to monitor the input current at the charging interface and control the converter so that the input current does not exceed a maximum input current.

3. A telecommunications device according to claim 1, wherein the controller is configured to monitor the input voltage and the input current, and control the converter to maximise the input power.

4. A telecommunications device according to claim 2, wherein the controller is configured to monitor the input voltage and the input current, and control the converter to maximise the input power.

5. A telecommunications device according to claim 1, wherein the controller controls the converter such that the input current is gradually increased to the point where the input voltage starts to drop to allow the maximum input voltage to be maintained.

6. A telecommunications device according to claim 1, wherein the controller is configured to monitor the output current of the converter and control the converter to maximize the output current.

7. A telecommunications device according to claim 1, wherein the converter is a buck converter.

8. A telecommunications device according to claim 7, wherein the controller controls the duty cycle of the buck converter.

9. A telecommunication device according to claim 1, wherein the controller is configured to monitor the input current at the charging interface and the output voltage to the battery and control the converter so that the input current does not exceed a predetermined input current, so that the output voltage to the battery is maintained at a required charging voltage and so that the input power is maximized.

10. A portable telecommunications device according to claim 1, wherein the power supply adjuster is configured to adjust the intake power from the external power supply by adjusting the output voltage of the external power supply.

11. A method comprising:
   providing an input voltage and current from a power supply to a charging interface of a portable telecommunications device;
   monitoring the input voltage and current using a processor and one or more analog-to-digital converters;

converting the input voltage and current at the charging interface into an output voltage and current for charging a battery according to a conversion ratio;

controlling the conversion ratio, wherein controlling the conversion ratio comprises controlling the conversion ratio so that the output current for charging the battery is higher than the input current to the charging interface; and adjusting an intake power from the external power supply by adjusting properties of the external power supply by signaling on the power line by analog modulation, digital data modulation, current modulation, added or subtracted voltage modulation, load interrupt sequencing, RF, magnetic field variations or inductions.

12. A method according to claim 11, comprising monitoring the input current at the charging interface and controlling the conversion ratio so that the input current does not exceed a maximum input current.

13. A method according to claim 11, comprising monitoring the input voltage and the input current, and controlling the conversion ratio to maximise the input power.

14. A method according to claim 12, comprising monitoring the input voltage and the input current, and controlling the conversion ratio to maximise the input power.

15. A method according to claim 11, comprising controlling conversion ratio such that the input current is gradually increased to the point where the input voltage starts to drop to allow the maximum input voltage to be maintained.

16. A method according to claim 11, comprising monitoring the output current of the converter and controlling the conversion ratio to maximise the output current.

17. A method according to claim 11, wherein the controlling the conversion ratio comprises controlling a duty cycle of a buck converter.

18. A method according to claim 11 further comprising monitoring the input current at the charging interface and the output voltage to the battery and controlling the conversion ratio so that the input current does not exceed a predetermined input current, so that the output voltage is maintained at a required charging voltage and to maximize the input power.

19. A method according to claim 11, wherein adjusting properties of the external power supply comprises adjusting the output voltage of the external power supply.

20. A portable telecommunications device comprising:
a charging interface for connection to an external power supply;
a voltage and current ratio converter configured to convert an input voltage and current at the charging interface into an output voltage and current for charging a battery;
a controller configured to control the voltage and current ratio converter, wherein the controller is configured to control the converter so that the output current for charging the battery is higher than the input current at the charging interface; and
the controller further comprising a power supply adjuster for adjusting the output voltage of the external power supply, by signaling on a power line to the external power supply, so as to adjust the intake power from the external power supply, the power supply adjuster being configured to signal on the power line by one or more of the following : analog modulation, digital data modulation, current modulation, added or subtracted voltage modulation, load interrupt sequencing, RF, magnetic field variations or inductions.

21. A portable telecommunications device comprising:
a charging interface for connection to an external power supply;
a voltage and current ratio converter configured to convert an input voltage and current at the charging interface into an output voltage and current for charging a battery;
a controller configured to monitor at least the input current at the charging interface and the output voltage for charging the battery and configured to control the voltage and current ratio converter so that the input current does not exceed a maximum input current that can be handled by the charging interface and so that the output voltage for charging the battery is maintained at a level corresponding to a fixed charging voltage for the battery, while controlling the converter so that the output current for charging the battery is higher than the input current at the charging interface to increase the charging power to the battery,
wherein the controller further comprises a power supply adjuster configured to adjust properties of an external power supply by signaling on a power line by one or more of the following: analog modulation, digital data modulation, current modulation, added or subtracted voltage modulation, load interrupt sequencing, RF, magnetic field variation or inductions.

* * * * *